Aug. 18, 1959 S. GISER 2,900,137

ELECTRONIC MULTIPLIER

Filed Feb. 21, 1955 3 Sheets-Sheet 1

INVENTOR.
SAMUEL GISER
BY Melvin R. Jenney
ATTORNEY

INVENTOR.
SAMUEL GISER
BY Melvin R. Jenney
ATTORNEY

Aug. 18, 1959 S. GISER 2,900,137

ELECTRONIC MULTIPLIER

Filed Feb. 21, 1955 3 Sheets-Sheet 3

INVENTOR.
SAMUEL GISER

BY Melvin R. Jenney

ATTORNEY

United States Patent Office 2,900,137
Patented Aug. 18, 1959

2,900,137

ELECTRONIC MULTIPLIER

Samuel Giser, Sharon, Mass., assignor, by mesne assignments, to Research Corporation, New York, N.Y., a corporation of New York Application February 21, 1955, Serial No. 489,499

5 Claims. (Cl. 235—194)

The present invention is related generally to electronic analog computers and more specifically to a multiplier capable of four quadrant multiplication of two variables by electronic apparatus.

In many special computer applications, as well as real time D.-C. analog computers, and especially with suppressed time scale repetitive analog computers, there is need for four quadrant multiplication of continuous variables by electronic means which can carry out the required operations at high speed. This is particularly important for suppressed time scale analog computers which present several thousand superimposed problem solutions as a composite solution during the real time scale of the problem being solved. The suppressed time scale computer has the advantage that the effect of changes in the parameters of the problem are instantly observed in the graphic solution to the problem, whereas in the real time analog computer each change requires a waiting period while the solution to the problem is being effected. However, the suppressed time scale analog computer requires a much higher speed of operation to yield solution times in microseconds rather than the seconds taken by real time computers. The rapid solution time leads to components having wide band pass and good high frequency characteristics as well as stability from drift. Although many systems for electronic multiplication have been proposed, conventional multipliers do not possess suitable characteristics for the high speed operation required for suppressed time scale repetitive analog computers.

The multiplier of the present invention is based upon the mathematical identity:

$$XY=\tfrac{1}{4}[(X+Y)^2-(X-Y)^2] \qquad (1)$$

The implementation of Equation 1 for four quadrant operation requires careful recognition of polarity and amplitude of all signal voltages present in the multiplier. Negative as well as positive input voltages are effectively applied to two channels, one of which yields the sum of the input variables and the other of which yields the difference of the input variables. Each channel feeds a pair of single quadrant quarter square law devices, one adapted to respond only to positive signals and the other adapted to respond only to negative signals. The squared outputs are combined with regard to the polarity of the input signals by means of summing and inverting amplifiers to produce an output potential substantially in accordance with Equation 1.

The principal object of the invention is to provide an electronic device capable of four quadrant multiplication of two variables for use with electronic analog computers.

Another object is to provide for electronic multiplication with an accuracy dependent primarily only on the precision of voltage and resistor components and free from drift.

A further object is to provide an electronic multiplier which is responsive to a wide frequency band pass to carry out its operation at high speeds suitable for use with suppressed time scale analog computers.

Other features of the invention consist of certain novel combinations and arrangements of parts hereinafter described and particularly defined in the claims.

Figure 1:
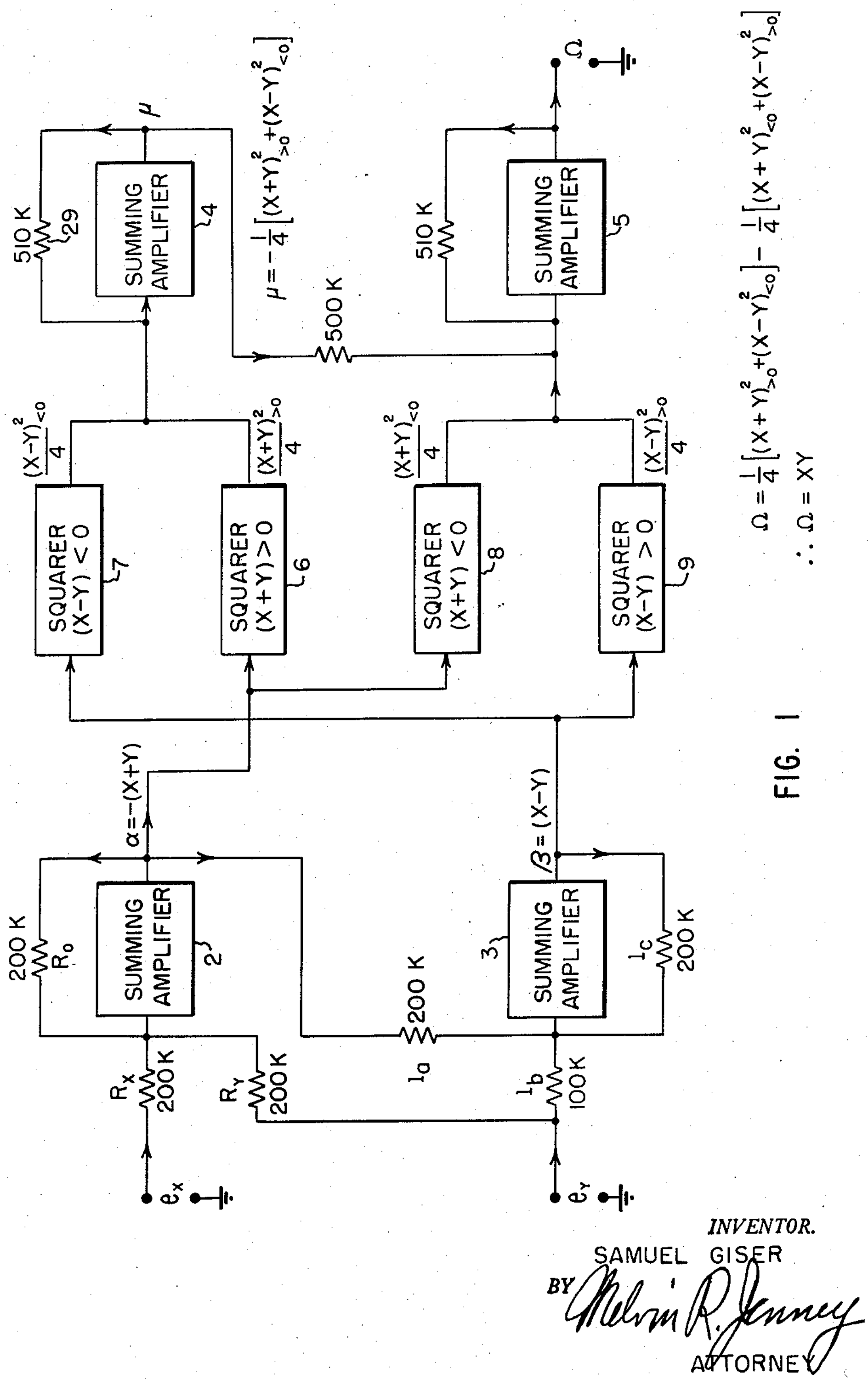
Fig. 1 is a block diagram schematically illustrating a multiplier.

The system, generally shown in the block diagram of Fig. 1, has as input potentials $e_X$ and $e_Y$ which are adjustable to provide amplitudes and polarities representing the magnitudes and signs of the two variables X and Y which are to be multiplied. Potentials $e_X$ and $e_Y$ may be taken directly as voltage outputs of an analog computer or they may be derived from computer output shafts by means of a suitable mechanical motion to voltage converter, for example, by means of a potentiometer. The input potentials may range from A.-C. at a frequency corresponding to a solution time of the order of 2 microseconds down to D.-C. In order that the output potential of the multiplier shall not be excessive, it is preferred that the sum of the input potentials shall not exceed 10 volts.

Potentials $e_X$ and $e_Y$ are applied to the input of summing amplifier 2 through an adding network made up of equal resistors $R_X$, $R_Y$ and feedback resistor $R_0$. The output $\alpha$ of amplifier 2 is proportional to the sum of $X+Y$, inverted in polarity.

Summing amplifier 2, as well as amplifiers 3, 4 and 5, may be any conventional wide band amplifier having high gain and heavy feedback. In such an amplifier the output voltage is given by the expression:

$$\alpha=\left[\frac{e_X}{R_X}+\frac{e_Y}{R_Y}\right]\frac{AR_0}{(1-A)+R_0\left(\frac{1}{R_X}+\frac{1}{R_Y}\right)}$$

With high gain amplifiers $A\gg1$, $$A\gg R_0\left(\frac{1}{R_X}+\frac{1}{R_Y}\right)$$

and $$\alpha=-R_0\left[\frac{e_X}{R_X}+\frac{e_Y}{R_Y}\right]$$

or $$\alpha=-(a_1e_X+a_2e_Y)$$

where $$a_1=\frac{R_0}{R_X}\text{ and }a_2=\frac{R_0}{R_Y}$$

Under the conditions shown in Fig. 1, where $$R_X=R_Y=R_0,\quad \alpha=-(e_X+e_Y)=-(X+Y) \qquad (2)$$

In similar manner, $\alpha$, the output of amplifier 2, and potential $e_Y$ are fed to the input of summing amplifier 3 through the adding network made up of resistors $1_a$, $1_b$ and feedback resistor $1_c$. By giving resistor $1_b$ one-half the value of resistors $1_a$ and $1_c$, the output $\beta$ of amplifier 3 is:

$$\beta=-2Y+(X+Y)\text{ or }=X-Y \qquad (3)$$

Thus it is seen that the summing amplifiers function to invert the summation input with unity gain and to isolate the input circuits from the output circuits. To be suitable for this function, it is required that the amplifiers have a band width greater than one megacycle with approximately 1-degree phase shift at 30 kilocycles and an open loop gain at D.-C. of about eight million. The amplifiers are also required to be stabilized to minimize D.-C. drift.

Figures 2, 3:
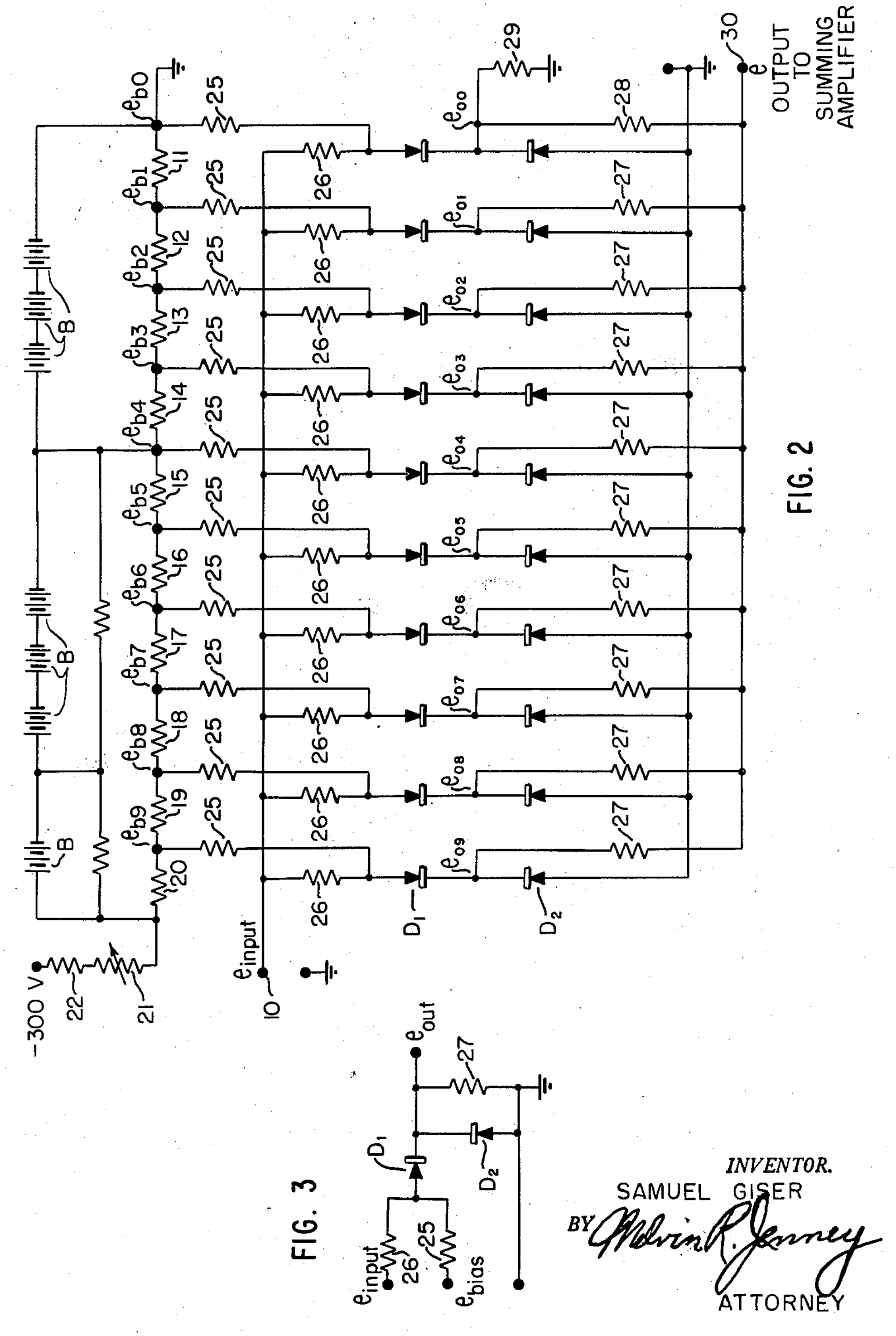
Fig. 2 is a diagram of the squaring element.
Fig. 3 is a diagram of a single inert zone unit of the squaring element of Fig. 2.

The squaring element 6, shown in detail in Fig. 2, employs the approximation that ten straight lines drawn as chords to a parabola represent the parabola itself within an accuracy of 0.25 percent. The squaring device adds and multiplies by the desired constant the outputs of ten inert zone units fed from low impedance voltage sources.

A single inert zone unit, shown in Fig. 3, includes a summing network consisting of resistors 26 and 25 energized respectively by an input potential $e_{in}$ and a constant negative or zero bias potential $e_{bias}$. The output of the summing network is applied through a series diode $D_1$ and a shunt diode $D_2$ to a load resistor 27. When the input potential $e_{in}$ has a positive value exceeding the negative bias potential $e_{bias}$ so that their sum is greater than zero, the series diode $D_1$ offers a low impedance and the shunt diode $D_2$ has a high impedance. Thus for equal values of resistors 25 and 26 substantially one-half the sum of $e_{in}$ plus $e_{bias}$ appears across diode $D_2$ and resistor 27. When the value of $e_{in}$ plus $e_{bias}$ is less than zero, the diodes $D_1$ and $D_2$ interchange their impedance levels. Commercial germanium diodes, such as type IN63, have better high frequency characteristics than electron tube diodes and are found to have a conductive impedance of 200 ohms or less and a non-conductive impedance of approximately 500,000 ohms. It is seen for commercial IN 63 diodes, when $e_{in}$ plus $e_{bias}$ is greater than zero, the output potential of the inert zone unit is substantially equal to $$\left(\frac{e_{in}+e_{bias}}{2}\right)$$

and when $e_{in}$ plus $e_{bias}$ is less than zero, the output potential is substantially $$\frac{200}{500{,}000}\left(\frac{e_{in}+e_{bias}}{2}\right)$$

Referring again to Fig. 2, ten inert zone units are interconnected such that the ten $e_{in}$ inputs are fed from a common bus connected to terminal 10 and the ten $e_{bk}$ bias potentials are derived from a battery regulated voltage divider made up of serially connected resistors, 11, 12, 13, 14, 15, 16, 17, 18, 19, 20, 21 and 22 connected between ground and a −300 volt supply. A plurality of precision mercury batteries B, which may take the form of the well-known Mallory RM4 mercury cells, are connected in series to obtain the desired total voltage and are shunted across the voltage divider to provide a plurality of equal steps of negative potential.

The $e_{b0}$ input connects to the zero voltage tap, the $e_{b1}$ connects to the −1 volt tap, and so on up to the $e_{b9}$ input which connects to the −9 volt tap. The $e_{00}$ output is connected through resistor 28 to an output terminal 30. $e_{00}$ is also shunted to ground through resistor 24. The $e_{01}$ through $e_{09}$ outputs are connected through resistors 27, each of equal resistance value to the output terminal 30. It is seen that resistor 28, resistors 27 and feedback resistor 29 of summing amplifier 4 as shown in Fig. 1, form a summing network and by making resistor 28 twice the value of each resistor 27 and resistor 29 in the network, the output potential of amplifier 4, $\mu$ is equal to the summation:

$$\mu=\tfrac{1}{2}\left(\frac{e_{in}+e_{b0}}{2}\right)\phi+\sum_{k=1}^{9}\frac{e_{in}+e_{bk}}{2}\phi$$
$$+\tfrac{1}{2}\left[.0004\left(\frac{e_{in}+e_{b0}}{2}\right)\right]\theta+\sum_{k=1}^{9}(.0004)\left(\frac{e_{in}+e_{bk}}{2}\right)\theta$$

where $\phi=1$ and $\theta=0$, if $e_{in}+e_{bk}$ is positive and
$\phi=0$ and $\theta=1$, if $e_{in}+e_{bk}$ is negative.

The sum of the first two terms of the above relationship is the desired ten segment approximation to a quarter square law. The sum of the last two terms constitutes an error, which at most is so small as to lie within the desired tolerance of accuracy. Neglecting the error voltage, Fig. 4 and the following table show the summation voltage of a ten inert zone unit network and the output voltage of each unit for input voltages ranging in value from 0 to 10.

*Table I*

| $e_{in}$ | $e_{00}$ | $e_{01}$ | $e_{02}$ | $e_{03}$ | $e_{04}$ | $e_{05}$ | $e_{06}$ | $e_{07}$ | $e_{08}$ | $e_{09}$ | $\sum_{0}^{9}=\frac{e_{in}^2}{4}$ |
|---|---|---|---|---|---|---|---|---|---|---|---|
| 1.0 | 0.25 | 0.0 | 0.0 | 0.0 | 0.0 | 0.0 | 0.0 | 0.0 | 0.0 | 0.0 | 0.25 |
| 2.0 | 0.50 | 0.5 | 0.0 | 0.0 | 0.0 | 0.0 | 0.0 | 0.0 | 0.0 | 0.0 | 1.00 |
| 3.0 | 0.75 | 1.0 | 0.5 | 0.0 | 0.0 | 0.0 | 0.0 | 0.0 | 0.0 | 0.0 | 2.25 |
| 4.0 | 1.00 | 1.5 | 1.0 | 0.5 | 0.0 | 0.0 | 0.0 | 0.0 | 0.0 | 0.0 | 4.00 |
| 5.0 | 1.25 | 2.0 | 1.5 | 1.0 | 0.5 | 0.0 | 0.0 | 0.0 | 0.0 | 0.0 | 6.25 |
| 6.0 | 1.50 | 2.5 | 2.0 | 1.5 | 1.0 | 0.5 | 0.0 | 0.0 | 0.0 | 0.0 | 9.00 |
| 7.0 | 1.75 | 3.0 | 2.5 | 2.0 | 1.5 | 1.0 | 0.5 | 0.0 | 0.0 | 0.0 | 12.25 |
| 8.0 | 2.00 | 3.5 | 3.0 | 2.5 | 2.0 | 1.5 | 1.0 | 0.5 | 0.0 | 0.0 | 16.00 |
| 9.0 | 2.25 | 4.0 | 3.5 | 3.0 | 2.5 | 2.0 | 1.5 | 1.0 | 0.5 | 0.0 | 20.25 |
| 10.0 | 2.50 | 4.5 | 4.0 | 3.5 | 3.0 | 2.5 | 2.0 | 1.5 | 1.0 | 0.5 | 25.00 |

Thus the output of squarer 6 is seen to be $e_{in}^2/4$ for positive values of $e_{in}$ and zero for negative values of $e_{in}$.

A second ten inert zone unit squaring element 7 can be arranged with the direction of conductivity of the diodes and the polarities of the bias potentials $e_{bk}$ reversed. In this way the squaring element 7 is made responsive to negative values of $(e_{in}+e_{bk})$ and non-responsive to positive values of $(e_{in}+e_{bk})$. In this case the output potential of amplifier 4 fed by squarer element 7 is equal to the summation:

$$\mu=-\tfrac{1}{2}\left(\frac{e_{in}+e_{b0}}{2}\right)\theta-\sum_{k=1}^{9}\left(\frac{e_{in}+e_{bk}}{2}\right)\theta$$
$$-\tfrac{1}{2}\left[.0004\left(\frac{e_{in}+e_{bk}}{2}\right)\right]\phi-\sum_{k=1}^{9}\left[.0000\left(\frac{e_{in}+e_{bk}}{2}\right)\right]\phi$$

where $\theta=1$ and $\phi=0$ if $e_{in}+e_{bk}$ is negative and
$\theta=0$ and $\phi=1$ if $e_{in}+e_{bk}$ is positive.

For squarer 7 the output is $e_{in}^2/4$ for negative values of $e_{in}$ and zero for positive values of $e_{in}$.

When the output $\alpha$ of amplifier 2 is fed as the input to squarer 6 and the output $\beta$ amplifier 3 is fed as the input to squarer 7, and when the outputs of squarers 6 and 7 are added and inverted by amplifier 4, the output $\mu$ of amplifier 4, neglecting the error voltages, is seen to be:

$$\mu=-\tfrac{1}{4}[f_1\alpha+f_2\beta] \quad (4)$$

where $$f_1\alpha=\alpha^2 \text{ for } \alpha>0$$
$$f_1\alpha=0 \text{ for } \alpha<0$$
$$f_2\beta=0 \text{ for } \beta>0$$
$$f_2\beta=\beta^2 \text{ for } \beta<0$$

$$\alpha=-(x+y) \quad (2)$$
$$\beta=(x-y) \quad (3)$$

Squaring element 8 is given the same polarity characteristics as those possessed by squarer 7 and squaring element 9 is identical in characteristics to squarer 6. When the output $\alpha$ of amplifier 2 is fed as the input to squarer 8 and the output $\beta$ of amplifier 3 is fed as the input to squarer 9, and when the outputs of squarers 8 and 9 are added to the output $\mu$ of amplifier 4 and inverted by amplifier 5, the output $\Omega$ of amplifier 5 takes the form $$\Omega=-\mu-\tfrac{1}{4}[f_1\beta+f_2\alpha]$$
$$\Omega=\frac{f_1\alpha}{4}+\frac{f_2\beta}{4}-\frac{f_1\beta}{4}-\frac{f_2\alpha}{4}$$

The first and last terms combine to yield $$\frac{f_1\alpha}{4}-\frac{f_2\alpha}{4}=\frac{\alpha^2}{4}$$

for all positive and negative values of $\alpha$. The second and third terms combine to yield $$\frac{f_2\beta}{4}-\frac{f_1\beta}{4}=-\frac{\beta_2}{4}$$

for all positive and negative values of $\beta$. Thus $$\Omega=\frac{\alpha^2}{4}-\frac{\beta^2}{4}$$

for all values of $\alpha$ and $\beta$ and the final substitution of $X+Y$ for $\alpha$ and $X-Y$ for $\beta$ gives:

$$\Omega=\tfrac{1}{4}[(X+Y)^2-(X-Y)^2]=XY \quad (1)$$

for all negative and positive values of X and Y to provide four quadrant multiplication of two variables.

Figure 4:
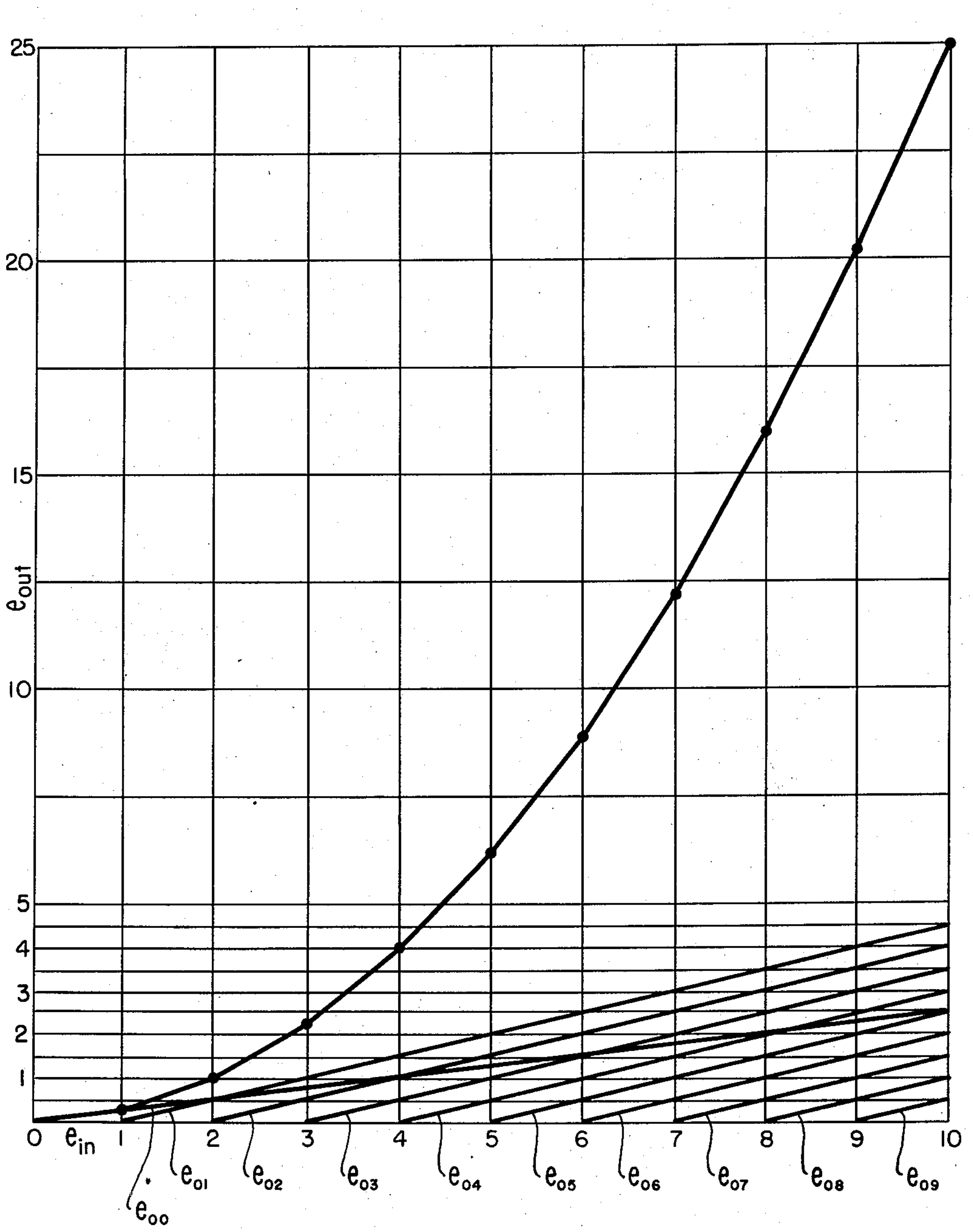
Fig. 4 is a graph illustrating the input to output characteristics of the squaring element of Fig. 2.

When the sum of the input potentials $e_X$ and $e_Y$ is restricted to a maximum of 10 volts, the output potential, as shown in Fig. 4, corresponds to a maximum magnitude of 25 volts, a value well suited for display on conventional cathode ray apparatus or for application to further utilization circuits.

While a preferred embodiment of the invention has been disclosed, it is to be understood that many changes may be made therein and that the matter hereinbefore set forth or shown in the accompanying drawings is to be interpreted as illustrative only and not in a limiting sense.

What is claimed is:

1. An electronic multiplier for four quadrant multiplication of two variables comprising, means for producing first and second potentials having amplitude and polarity representing the magnitude and sign respectively of first and second variables, means responsive to said first and second potentials to derive a first output potential proportional in amplitude to the sum thereof but inverted in polarity, means responsive to said second potential and said first output potential to derive a second output potential proportional in amplitude to the difference of said first and second potentials and having the same polarity, a plurality of single quadrant square law devices, each of said devices being responsive only to a given polarity of input signal to derive an output signal of the same polarity having an instantaneous amplitude substantially proportional to one-fourth the square of the amplitude of said input signal, means applying said first output potential as the input signal to a first pair of said devices having opposite polarity of response, means applying said second output potential as the input signal to a second pair of said devices having opposite polarity of response, and means for so combining and inverting the output signals of said plurality of square law devices that an instantaneous summation output voltage is derived substantially proportional to one-fourth the square of said sum minus one-fourth the square of said difference to represent the product of said variables.

2. An electronic multiplier for obtaining the product of two variables comprising, means for producing first and second potentials having amplitude and polarity representing the magnitude and sign respectively of first and second variables, means responsive to said first and second potentials to obtain a first output potential proportional to the sum thereof inverted in polarity, means responsive to said second potential and to said first output potential to obtain a second output potential proportional to the difference of said first and second potentials, a first squaring element biased to be responsive to positive input potentials and connected to said first output potential to obtain a first output voltage of positive polarity instantaneously proportional to one-fourth the square of the sum of said first and second potentials, a second squaring element biased to be responsive to negative input potentials and connected to said second output potential to obtain a second output voltage of negative polarity instantaneously proportional to one-fourth the square of the difference of said first and second potentials, a third squaring element biased to be responsive to negative input potentials and connected to said first output potential to obtain a third output voltage of negative polarity instantaneously proportional to one-fourth the square of the sum of said first and second potentials, a fourth squaring element biased to be responsive to positive input potentials and connected to said second output potential to obtain a fourth output voltage of positive polarity instantaneously proportional to one-fourth the square of the difference of said first and second potentials, means responsive to said first and second output voltages to obtain a fifth output voltage proportional to the instantaneous sum thereof inverted in polarity, and means responsive to said third, fourth and fifth output voltages to obtain the instantaneous sum thereof inverted in polarity thereby representing the product of said two variables as one-fourth the square of the sum of said variables minus one-fourth the square of the difference of said variables.

3. An electronic multiplier in accordance with claim 2 wherein each of said squaring elements is composed of a plurality of inert zone units, an output terminal, each of said units including a network of first and second serially connected resistors, a load resistor connected at one end to said terminal, a first diode connected between the common junction of said first and second resistors and the second end of said load resistor, and a second diode connected between said second end of said load resistor and ground, said first and second diodes being polarized to conduct in opposite directions; means for biasing the free end of said second resistor of successive units to increasingly higher constant voltage levels of equal steps, said first diode of each of said units being polarized to conduct upon application of an input voltage to the free end of said first resistor connected thereto of greater amplitude and opposite polarity to the bias voltage thereat; and means for summing the voltage across said load resistors whereby said sum voltage increases substantially as the square of said input voltage as successive additional inert zone units become conducting with increasing amplitude of said input voltage.

4. An electronic multiplier for obtaining the product of two variables comprising, a first potential having amplitude and polarity representing the magnitude and sign of a first variable, a second potential having amplitude and polarity representing the magnitude and sign of a second variable, a first amplifier responsive to said first and second potentials to produce an output potential representing the sum of said first and second potentials inverted in polarity, a second amplifier responsive to the output of said first amplifier and to said second potential to produce an output potential representing the difference of said first and second potentials, a first square law device biased to be non-responsive to inputs of negative polarity and connected to the output of said first amplifier to produce an output potential substantially proportional to one-fourth the square of positive polarities of the sum of said first and second potentials, a second square law device biased to be non-responsive to inputs of positive polarity and connected to the output of said first amplifier to produce an output potential substantially proportional to one-fourth the square of negative polarities of the sum of said first and second potentials, a third square law device biased to be non-responsive to inputs of negative polarities and connected to the output of said second amplifier to produce an output potential substantially proportional to one-fourth the square of positive polarities of the difference of said first and second potentials, a fourth square law device biased to be non-responsive to inputs of positive polarity and connected to the output of said second amplifier to produce an output potential substantially proportional to one-fourth the square of negative polarities of the difference of said first and second potentials, a third amplifier responsive to the outputs of said first and fourth square law devices to produce an output potential substantially equal to the sum thereof with reversed polarity, and a fourth amplifier responsive to the output of said third amplifier and the outputs of said second and third square law devices to produce an output potential proportional to the sum thereof with reversed polarity, whereby the ouputs of said square law devices are combined in predetermined polarity with respect to the polarity of said first and second potentials to yield the product of said first and second variables as one-fourth the square of the sum of said variables minus one-fourth the square of the difference of said variables.

5. An electronic multiplier in accordance with claim 4 wherein each of said squaring elements is composed of a plurality of inert zone units; each of said units comprising an input network of first and second serially connected resistors, a load resistor, a first diode connected between the common junction of said first and second resistors and the one end of said load resistor, and a second diode connected between said one end of said load resistor and ground, said first and second diodes being polarized to conduct in opposite directions; a common input line connected to the free end of said first resistor of each of said plurality of units; a tapped voltage divider arranged to provide at successive taps thereon a series of constant voltages increasing in equal steps, means connecting the free end of said second resistor of successive units of said plurality of units to successive voltage taps along said voltage divider thereby biasing said plurality of units so that successive units are biased to increasingly higher voltage levels, said first diode of each of said units being polarized to conduct upon the application of an input voltage having greater amplitude and opposite polarity to said bias voltage; and a common output line connecting the second end of each of said load resistors to form a summing network, whereby successive additional inert zone units become conducting with successive step increases of input voltage impressed between said input line and ground to yield an output voltage between said output line and ground varying substantially in proportion to the square of said input voltage.

References Cited in the file of this patent

UNITED STATES PATENTS

| | | |
|---|---|---|
| 2,674,409 | Lakatos | Apr. 6, 1954 |
| 2,831,107 | Raymond et al. | Apr. 15, 1958 |

OTHER REFERENCES

Chance: "A Quarter-Square Multiplier Using a Segmented Parabolic Characteristic," The Review of Scientific Instruments, vol. 22, Number 9, September 1951, pages 683–688.

Catalog and Manual on GAP/R High-Speed All-Electronic Analog Computors for Research and Design, published by Geo. A. Philbrick Researches, Inc., 1951, 230 Congress St., Boston 10, Mass., page 18 relied on.

"Cyclone-Symposium II on Simulation and Computing Techniques, Part 2," Reeves Instrument Corporation, April 28–May 2, 1952, page 233 relied on.

Electronic Analog Computers (Korn and Korn), published by McGraw-Hill Book Co., New York, 1952, page 214 relied on.

Norsworthy "A Simple Electronic Multiplier," Electronic Engineering (London), No. 26, February 1954, pp. 72–75.

Introduction to Electronic Analogue Computers (Wass), published by McGraw-Hill Book Co., New York, 1955, pages 141–142 relied on.